US009047770B2

(12) United States Patent
Lafon et al.

(10) Patent No.: US 9,047,770 B2
(45) Date of Patent: Jun. 2, 2015

(54) METHOD FOR DETERMINING AN INSTANTANEOUS OR ANTICIPATED PROBABLE ZONE OF OCCUPANCY OF AN AIRCRAFT IN AN AIRPORT NAVIGATION ZONE

(71) Applicant: Thales, Neuilly sur Seine (FR)

(72) Inventors: Stéphanie Lafon, Merignac (FR); François Michel, Saint Medard en Jalles (FR)

(73) Assignee: Thales, Neuilly Sur Seine (FR)

( * ) Notice: Subject to any disclaimer, the term of this patent is extended or adjusted under 35 U.S.C. 154(b) by 128 days.

(21) Appl. No.: 13/857,979

(22) Filed: Apr. 5, 2013

(65) Prior Publication Data

US 2014/0236470 A1 Aug. 21, 2014

(30) Foreign Application Priority Data

Apr. 6, 2012 (FR) ..................................... 12 01027

(51) Int. Cl.

| | |
|---|---|
| ***G06F 17/10*** | (2006.01) |
| ***G08G 5/04*** | (2006.01) |
| ***G08G 5/06*** | (2006.01) |
| ***G08G 5/00*** | (2006.01) |

(52) U.S. Cl.

CPC .................. *G08G 5/04* (2013.01); *G08G 5/065* (2013.01); *G08G 5/0065* (2013.01)

(58) Field of Classification Search

CPC ........................................................ G08G 5/04

USPC ........................................................ 701/301

See application file for complete search history.

(56) References Cited

U.S. PATENT DOCUMENTS

| | | | | |
|---|---|---|---|---|
| 5,023,799 | A * | 6/1991 | Nakayama et al. | 701/525 |
| 6,282,488 | B1 * | 8/2001 | Castor et al. | 701/120 |
| 6,420,995 | B1 * | 7/2002 | Richmond et al. | 342/45 |
| 7,194,342 | B1 * | 3/2007 | Horvath et al. | 701/3 |
| 7,202,776 | B2 * | 4/2007 | Breed | 340/435 |

(Continued)

FOREIGN PATENT DOCUMENTS

FR 2 935 524 A1 3/2010

OTHER PUBLICATIONS

French Search Report for Counterpart French Patent Application No. 1201027, 8 pgs. (Nov. 23, 2012).

*Primary Examiner* — Calvin Cheung

(74) *Attorney, Agent, or Firm* — Blakely, Sokoloff, Taylor & Zafman LLP

(57) ABSTRACT

The general field of the invention is that of methods for determining safety zones surrounding an aircraft travelling or taking off from an airport zone, the safety zone being calculated at a determined instant that may be the present instant or the future instant. The method according to the invention comprises at least the following steps:

Step 0: Establishment of a convex safety envelope surrounding the aircraft on the basis of reference points taken on the aircraft;

Step 1: Establishment of a first convex envelope safety zone surrounding the aircraft on the basis of reference circles taken on the aircraft, each circle having as center one of the reference points and as radius the value of the uncertainty in the exact position of the aircraft.

Other steps of the method make it possible to refine this first safety zone depending on whether the aircraft is in a taxiing or takeoff phase and depending on whether it is calculated at the present instant or at the future instant.

8 Claims, 3 Drawing Sheets

(56) References Cited

U.S. PATENT DOCUMENTS

| | | | | |
|---|---|---|---|---|
| 7,342,514 | B1 * | 3/2008 | Bailey et al. | 340/961 |
| 8,193,948 | B1 * | 6/2012 | Shapiro et al. | 340/965 |
| 8,737,684 | B2 * | 5/2014 | Meloche et al. | 382/103 |
| 2003/0093187 | A1 * | 5/2003 | Walker | 701/1 |
| 2009/0002222 | A1 * | 1/2009 | Colburn et al. | 342/145 |
| 2009/0115637 | A1 | 5/2009 | Naimer et al. | |
| 2010/0026554 | A1 * | 2/2010 | Longman et al. | 342/62 |
| 2010/0079342 | A1 * | 4/2010 | Smith et al. | 342/451 |
| 2010/0114633 | A1 * | 5/2010 | Sislak et al. | 705/7 |
| 2010/0198490 | A1 * | 8/2010 | Breen et al. | 701/120 |
| 2010/0328138 | A1 * | 12/2010 | Guigne et al. | 342/33 |
| 2011/0213513 | A1 * | 9/2011 | Naderhirn | 701/3 |
| 2011/0231096 | A1 | 9/2011 | Ridenour, II | |
| 2013/0131908 | A1 * | 5/2013 | Trepagnier et al. | 701/23 |

* cited by examiner

METHOD FOR DETERMINING AN INSTANTANEOUS OR ANTICIPATED PROBABLE ZONE OF OCCUPANCY OF AN AIRCRAFT IN AN AIRPORT NAVIGATION ZONE

BACKGROUND OF THE INVENTION

1. Field of the Invention

The field of the invention is that of airport navigation of aircraft and more precisely that of the safety zones surrounding a machine either in its immediate environment or in its environment in the near future.

2. Description of the Prior Art

During phases when an aircraft is taxiing around an airport, to avoid any incident or collision with another aircraft, it is important that the crew have a perfect knowledge of the environment of their machine. For this purpose, the system of cockpit viewing units presents them with the situation of the surrounding traffic. The position of each aircraft can be recovered by virtue of the information provided by systems of ADS-B type signifying "Automatic Dependent Surveillance Broadcast". This presentation can be done in various ways.

By way of first example, it can be ensured in the so-called "HUC" head-up collimator of the machine. The most intuitive way of symbolizing the various other aircraft situated in the immediate environment of the machine is to represent them in a view compliant and/or non-compliant with their exact location. U.S. Pat. No. 7,342,514 entitled "Display of Automatic Dependent Surveillance (ADS-B) on Head-Up Display" illustrates this type of representation. Reference will be made in particular to FIGS. 1 to 5 of this patent.

By way of second example, it is possible to represent in a so-called Head-Down viewing unit an aerial view of the airport zone in which the machine is situated. U.S. Pat. No. 7,194,342 entitled "Navigational instrument, method and computer program product for displaying ground traffic information" illustrates this type of representation. Reference will be made in particular to FIG. 3 of this patent.

These various approaches afford information by way of indication allowing the crew to remain vigilant. In certain situations, this information does not make it possible to monitor sufficiently precisely the behaviour of dangerous aeroplanes and therefore to comply scrupulously with the regulatory separation distances imposed on aeroplanes and vehicles at an airport.

Now, a certain number of ground collisions are due to poor assessment of the precise crowding of aeroplanes on runways. A pilot may, for example, decide to take off thinking that the runway is clear while an aeroplane still has part of its fuselage on the runway or else too close to the latter.

SUMMARY OF THE INVENTION

The aim of the invention is to offer the pilot a simple and intuitive means of avoiding this type of incident by offering him surveillance means based on targeted and precise information. The solution consists in representing the surrounding traffic using as input data not only the position of the aircraft but also additional information which makes it possible to refine the detection of conflict situations. This additional information comprises inter alia the level of precision of the location data used, the type of aircraft, its speed, its heading, its altitude. The method according to the invention is essential for refining the detection of conflict situations and thus avoiding any collisions. It also makes it possible to avoid any false alert hampering the driving of the machine.

More precisely, the subject of the invention is a method for determining a safety zone surrounding an aircraft travelling or taking off from an airport zone, the safety zone being calculated at a determined instant, characterized in that it comprises at least the following steps:

- Step 0: Establishment of a convex safety envelope surrounding the aircraft on the basis of reference points taken on the aircraft;
- Step 1: Establishment of a first convex safety zone surrounding the aircraft on the basis of reference circles taken on the aircraft, each circle having as centre one of the reference points and as radius the value of the uncertainty in the exact position of the aircraft.

Advantageously, the method comprises a step 2 succeeding steps 0 and 1, consisting of:

- Step 2: Establishment of a second convex safety zone surrounding the aircraft, the said second zone being equal to the first zone extended aft of the aircraft by a blast zone corresponding to the blast cone of the jets of the aircraft.

Advantageously, when the aircraft has taken off, the method comprises a step 3 succeeding steps 0, 1 and 2 consisting of:

- Step 3: Establishment of a third convex safety zone situated at ground level of the airport zone, the said third safety zone being equal to the aircraft's wake turbulence zone, the size and the shape of this third safety zone depending on the determined instant situated after the instant of takeoff of the aircraft.

Advantageously, the method comprises a step 4 succeeding at least steps 0 and 1, consisting of:

- Step 4: Establishment of a fourth convex safety zone surrounding the aircraft, the said fourth safety zone being equal to at least the first zone extended fore of the aircraft by a braking zone corresponding to the aircraft's braking distance. Advantageously, the determined instant is the present time of the aircraft.

Advantageously, the determined instant being the future time of the aircraft, the method comprises a step 5 succeeding at least steps 1 and 2, consisting of:

- Step 5: Establishment of a fifth safety zone surrounding the aircraft, the said fifth safety zone being equal to the convolution product of the first, of the second or of the fourth envelope surrounding the aircraft with at least one potential path that may be traversed in the airport zone by the aircraft at a determined speed for a duration commencing at the present instant and finishing at the future instant.

Advantageously, the fifth safety zone is equal to the convolution product of the first or of the second or of the fourth safety zone surrounding the aircraft with the entirety of the potential paths that may be traversed in the airport zone by the aircraft at a determined speed for a duration commencing at the present instant and finishing at the future instant.

The subject of the invention is also a cockpit viewing system comprising first means, the first means being an avionics system arranged so as to implement the previous method and a viewing device comprising at least one representation of the airport zone, of the position of the aircraft and of a safety zone surrounding the aircraft.

BRIEF DESCRIPTION OF THE DRAWINGS

The invention will be better understood and other advantages will become apparent on reading the nonlimiting description which follows and be virtue of the appended figures among which.

DETAILED DESCRIPTION

The method according to the invention consists in determining a safety zone surrounding an aircraft travelling or taking off from an airport zone. Of course, this method requires information about the aircraft, about the airport zone and about the immediate environment of the said aircraft. These data which are available on the very great majority of modern aircraft, are detailed in the subsequent description. The method also requires calculation means which, here again, are available on modern aircraft. These calculations do not present any particular difficulties.

This method comprises at least two compulsory steps detailed hereinbelow.

Initially, in so-called Step 0, the convex envelope of the aircraft is calculated. It is obtained by joining reference points denoted PR situated at the various extremities of the machine and which correspond mainly to the front extremity of the fuselage, to the extremities of the wings and to the tailplane in such a way that the envelope obtained covers the entire surface of the machine without concave parts. These reference points PR therefore correspond to the vertices of a reference skeleton specific to each aircraft. They are all referenced with respect to a location point PL of the aircraft as representing its position in the airport zone. This point can be for example the position of the ADS-B transmitter situated in the aircraft. These reference points arise from a database containing the relative position of each of these points as well as that of the location point PL.

Figure 1:
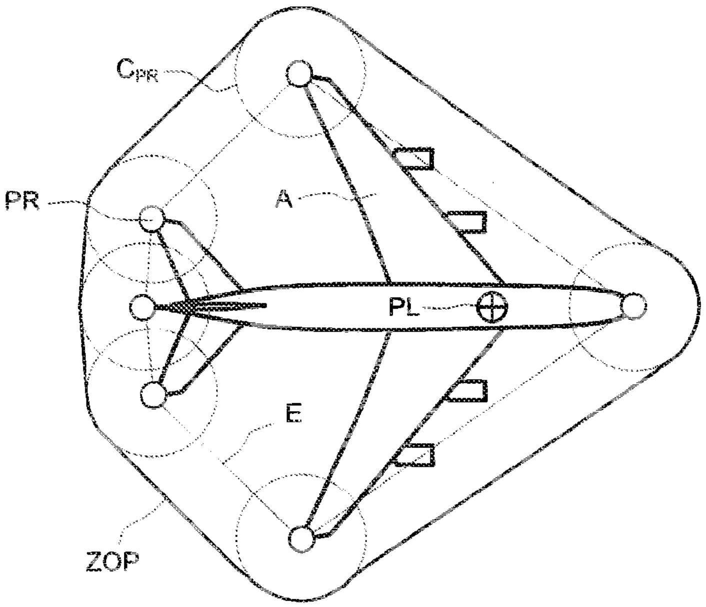
FIG. 1 represents a first safety zone according to the invention.

By way of example, FIG. 1 represents a plan view of an aircraft A of quad-jet type on which have been represented in a simplified manner six reference points PR, the location point PL and the envelope E which links the reference points PR by fine lines. All the figures are plan views and the safety zones appear as plane surfaces. Of course, it is conceivable for the safety zones to be represented by three-dimensional surfaces.

Thereafter, in step 1 of the method according to the invention, a first convex safety zone surrounding the aircraft is established, also called the probable occupancy zone or "ZOP". Indeed, the position of the aircraft is known with a certain precision which is not negligible compared with the dimensions of the machine and which must be taken into account to establish the ZOP. Thus, the current locating systems of GPS type, the acronym standing for "Global Positioning System" have a measurement uncertainty of several meters. A simple expedient is to replace each reference point PR by a circle $C_{PR}$ having as centre the reference point PR and as radius R the value of the uncertainty in the exact position of the aircraft. The ZOP is thereafter calculated by linking the various circles with tangent segments.

By way of example, the reference points PR of FIG. 1 are surrounded by circle $C_{PR}$ and the probable occupancy zone or ZOP is represented by bold lines.

The aircraft can also receive the speed and the wingspan of the surrounding aeroplanes by virtue, for example, of the ADS-B system which is a signal with a coverage of 200 nautical miles and which tends to be generalized on modern aircraft.

The separation distance between two aircraft travelling around one and the same airport zone is therefore no longer calculated between their two location points but between their two respective ZOPs.

Figure 2:
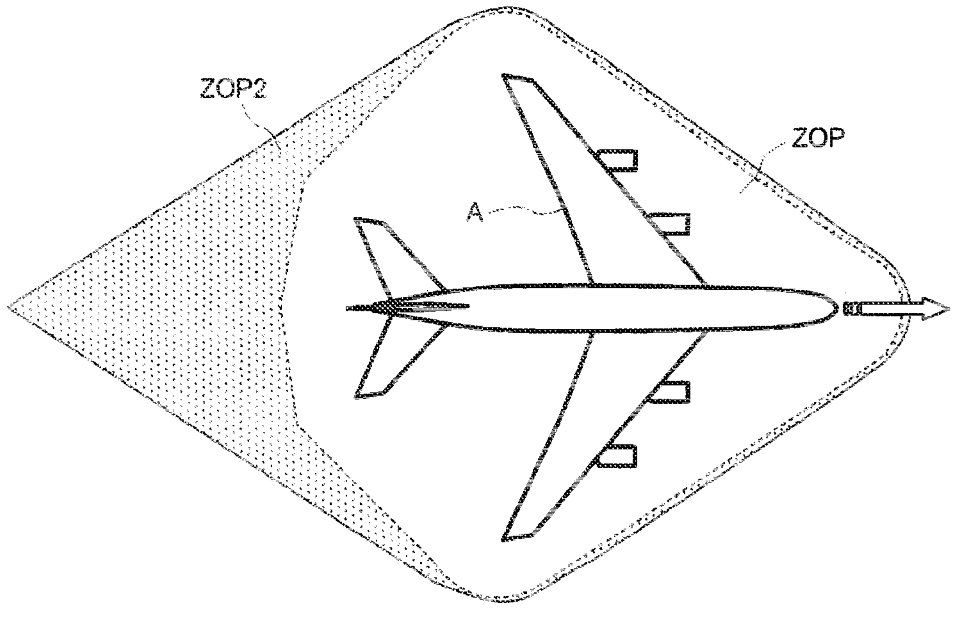
FIG. 2 represents a second safety zone according to the invention.

Once this first ZOP has been defined, it is beneficial to add a zone aft of the aeroplane corresponding to the blast cone of the jets, which depends on the type of aeroplane, and into which no craft may in any circumstance penetrate. By way of example, FIG. 2 represents in plan view a probable occupancy zone termed ZOP2 equal to the initial ZOP of FIG. 1 extended aft of the aircraft A by a blast zone represented in grey in FIG. 2. The initial ZOP is depicted in white and delimited by dashes in FIG. 2. It is noted that the addition of an aft cone may simplify the shape of the ZOP and consequently decrease the volume of calculation required.

When an aeroplane has just taken off, wake turbulence is noted on the runway a few instants after its takeoff. Other aeroplanes must not approach this turbulence. It may therefore be considered that a part of the ZOP of the aeroplane which has just taken off remains on the runway and represents this zone related to wake turbulence. Under these conditions, the ZOP of a machine is the union of the zone surrounding the aeroplane which has just taken off and of this zone representing the ground wake turbulence on the runway. This ground zone disappears once the turbulence ceases. This duration depends on the type of the aeroplane and certain takeoff parameters.

Figure 3:
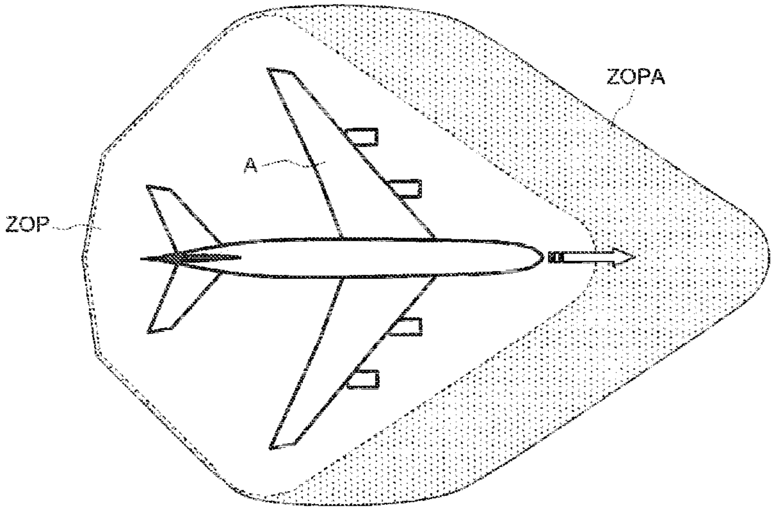
FIG. 3 represents a fourth safety zone according to the invention.

It is also possible to add to the initial ZOP a frontal safety zone defining, at any instant, the braking area required to halt the aircraft. This frontal zone is called the anticipated occupancy zone or ZOA and the union of the ZOP and of the ZOA is called the probable and anticipated occupancy zone or ZOPA. By way of illustration, FIG. 3 represents in plan view the initial ZOP in white and the ZOA in grey surrounding an aircraft A. The white arrow is representative of the speed and direction of the machine.

This ZOA depends:

- on the anticipation of the trajectory of the aeroplane, made possible by virtue of the recording of a few previous positions of the aircraft;
- on the speed of the aircraft;
- and optionally on meteorological data such as the risks of black ice, the intensity of the rain, the force of the wind liable to modify this braking area. It should be noted that the control tower signals the state of the runways to pilots if need be.

Figure 4:
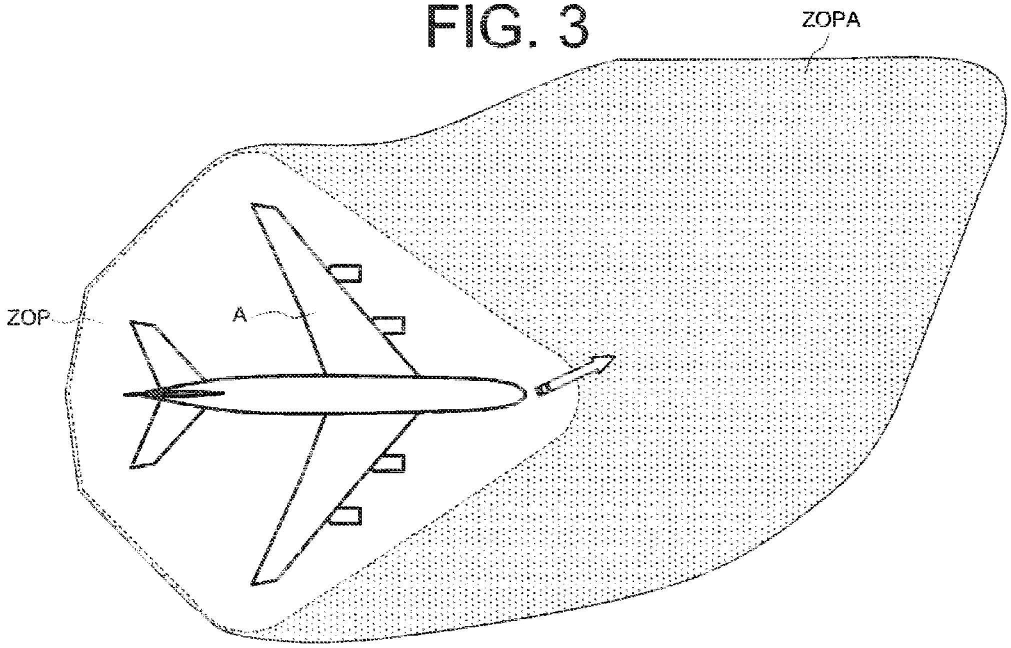
FIGS. 4, 5 and 6 represent a fifth safety zone according to the invention.

It is possible to construct other, more complex, ZOAs taking account, for example, of the curved trajectory of an aeroplane as seen in FIG. 4. In all cases, a ZOPA of the aeroplane is obtained which allows continuous monitoring of the so-called separation safety distances between aeroplanes.

To decrease the times for calculating the safety distances and/or decrease the memory space required for storing the data representing the probable occupancy zones, it is possible to approximate certain parameters. Thus, by way of first example, during the calculation of the aircraft's occupancy zone, the curved trajectory of the aircraft can be regarded as a rectilinear trajectory. By way of second example, the zone can be a simple polygon consisting of straight line segments. It suffices to judiciously choose the reference points PR taken on the aircraft.

Throughout the foregoing, the safety zones are essentially defined at the present instant or in the very near future of the machine. It is also possible to define a "ZOPA" for an instant in the future of the aircraft called instant T, that is to say a zone corresponding to the various possible positions of the aircraft between the present instant and an instant in the future.

To establish this zone, it is necessary to ascertain the path or paths liable to be followed by the aircraft. These paths are determined by exploring the airport zone connectivity graph situated in front of the aircraft. It is also necessary to ascertain the envisageable speed of the aircraft. For safety, it may be beneficial to replace this envisaged speed by the permitted maximum speed of travel on the runways of an airport zone which is around thirty knots. The safety zone or ZOPA(T) is then equal to the convolution product of the ZOPA surrounding the aircraft with the path to be traversed.

Figure 5:
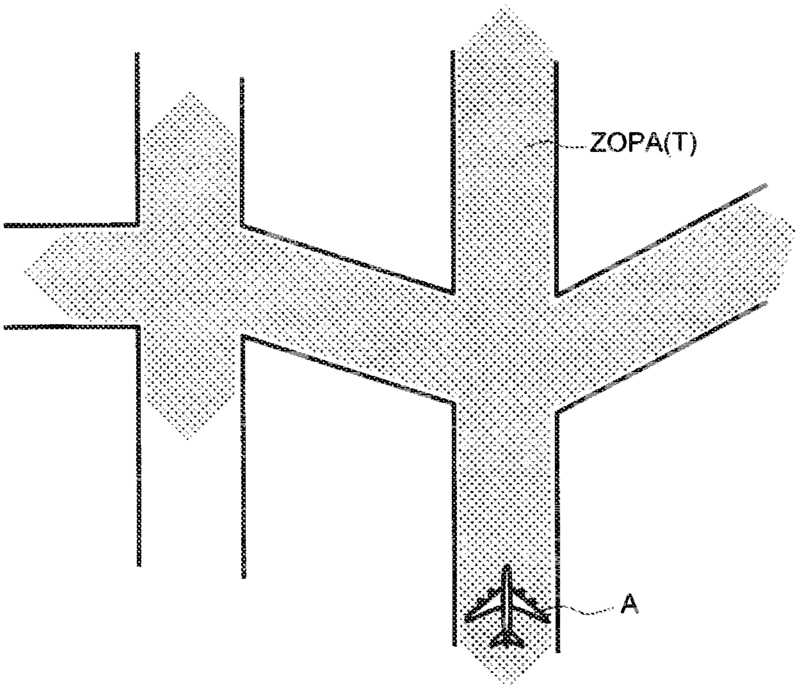
Figure 6:
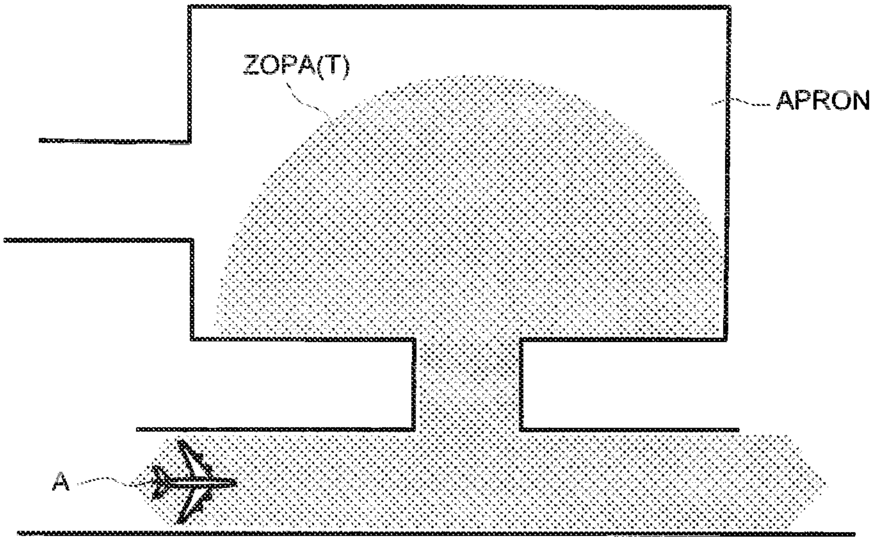

FIG. 5 represents an exemplary calculation of an occupancy zone ZOPA(T) of the aircraft A for an instant in the future. If the ZOPA attains a multidirectional zone such as for example, a parking area, also called the "apron", the distance which remains to be traversed is taken as the radius of a disc part inscribed in the said zone. FIG. 6 illustrates this configuration where an aircraft A is close to an APRON area.

Once determined, the various safety zones such as they have just been defined are presented to the crew of the aircraft by the various viewing systems present in the cockpit. It is possible, as in the various figures, to effect a representation of the ZOPAs in plan view. It is also possible to carry out representations of the ZOPAs in perspective in compliant or non-compliant mode. This depends on the type of displays used.

On these various views, it is possible to add information relating to the airport traffic, the airport, the aircraft or its travel conditions such as headings, speeds, transit times, etc.

What is claimed is:

1. A method for determining a safety zone surrounding an aircraft taxiing around an airport or taking off from an airport zone at a determined instant, the method comprising:

establishing, by an avionics system, a convex safety envelope surrounding the aircraft based on reference points taken on the aircraft, wherein the reference points are situated at extremities of the aircraft, wherein at least one of the reference points corresponds to a front extremity of a fuselage of the aircraft, wherein at least one of the reference points corresponds to extremities of wings of the aircraft, and wherein at least one of the reference points corresponds to a tailplane of the aircraft; and establishing, by the avionics system, a first convex safety zone surrounding the aircraft based on reference circles taken on the aircraft, each circle having a center that is one of the reference points and a radius that is equivalent to a value of a measurement uncertainty of a position of the aircraft, wherein the value is larger than one meter.

2. The method according to claim 1, further comprising:

establishing, by the avionics system, a second convex safety zone surrounding the aircraft, the second zone being equal to the first zone extended aft of the aircraft by a blast zone corresponding to a blast cone of the aircraft, wherein the second convex safety zone is established by the avionics system after the convex safety envelope and the first convex safety zone have been established by the avionics system.

3. The method according to claim 2, further comprising:

establishing, by the avionics system, a third convex safety zone situated at a ground level of the airport zone, the third safety zone being equal to a wake turbulence zone of the aircraft, a size and a shape of the third safety zone depending on the determined instant being an instant of takeoff of the aircraft, wherein the third convex safety zone is established by the avionics system after the convex safety envelope, the first convex safety zone, and the second convex safety zone have been established by the avionics system.

4. The method according to claim 2, further comprising:

establishing, by the avionics system, a fifth safety zone surrounding the aircraft, the fifth safety zone being equal to a convolution product of at least one of the first zone, the second zone, or the fourth zone and one or more potential paths that may be traversed in the airport zone by the aircraft at a determined speed for a duration commencing at a present instant and finishing at a future instant.

5. The method according to claim 4, wherein the fifth safety zone is equal to the convolution product of at least one of the first zone, the second zone, or the fourth zone and a plurality of the one or more potential paths.

6. The method according to claim 1, further comprising:

establishing, by the avionics system, a fourth convex safety zone surrounding the aircraft, the fourth safety zone being equal to at least the first zone extended fore of the aircraft by a braking zone corresponding to a braking distance of the aircraft, wherein the fourth convex safety zone is established by the avionics system after the convex safety envelope and the first convex safety zone have been established by the avionics system.

7. The method according to claim 1, wherein the first determined instant is a present time of the aircraft.

8. A cockpit viewing system comprising:

an avionics system and a viewing device, the avionics system configured to determine a safety zone surrounding an aircraft taxiing around an airport or taking off from an airport zone at a determined instant, wherein determining the safety zone surrounding the aircraft comprises:

establishing, by the avionics system, a convex safety envelope surrounding the aircraft based on reference points taken on the aircraft, wherein the reference points are situated at extremities of the aircraft, wherein at least one of the reference points corresponds to a front extremity of a fuselage of the aircraft, wherein at least one of the reference points corresponds to extremities of wings of the aircraft, and wherein at least one of the reference points corresponds to a tailplane of the aircraft; and establishing, by the avionics system, a first convex safety zone surrounding the aircraft based on reference circles taken on the aircraft, each circle having a center that is one of the reference points and a radius that is equivalent to a value of a measurement uncertainty of a position of the aircraft, wherein the value is larger than one meter, and the viewing device comprising at least one representation of the airport zone, the position of the aircraft, and the safety zone surrounding the aircraft.

* * * * *